US009584852B2

United States Patent
Bhogal et al.

(10) Patent No.: US 9,584,852 B2
(45) Date of Patent: Feb. 28, 2017

(54) SYNCHRONIZING TWO OR MORE DISPLAY DEVICES TO AUGMENT USER EXPERIENCE

(71) Applicant: International Business Machines Corporation, Armonk, NY (US)

(72) Inventors: Kulvir S. Bhogal, Fort Worth, TX (US); Gregory J. Boss, Saginaw, MI (US); Sheryl L. Comes, Denver, CO (US); Rick A. Hamilton, II, Chartlottesville, VA (US); Anne R. Sand, Cannon City, CO (US)

(73) Assignee: International Business Machines Corporation, Armonk, NY (US)

( * ) Notice: Subject to any disclaimer, the term of this patent is extended or adjusted under 35 U.S.C. 154(b) by 99 days.

(21) Appl. No.: 14/471,542

(22) Filed: Aug. 28, 2014

(65) Prior Publication Data

US 2016/0066019 A1 Mar. 3, 2016

(51) Int. Cl.
*G06F 17/00* (2006.01)
*H04N 21/43* (2011.01)
*H04N 21/41* (2011.01)
*H04N 21/81* (2011.01)

(52) U.S. Cl.
CPC ..... *H04N 21/4307* (2013.01); *H04N 21/4122* (2013.01); *H04N 21/4126* (2013.01); *H04N 21/8133* (2013.01)

(58) Field of Classification Search
USPC .................................. 235/375, 435
See application file for complete search history.

(56) References Cited

U.S. PATENT DOCUMENTS

| 8,473,977 | B2 | 6/2013 | Sandoval |
| 2009/0055383 | A1 | 2/2009 | Zalewski |
| 2013/0198642 | A1 | 8/2013 | Carney et al. |
| 2013/0221084 | A1* | 8/2013 | Doss ............... H04W 12/06 235/375 |
| 2014/0203071 | A1* | 7/2014 | Eggert ............. G06F 17/30002 235/375 |

OTHER PUBLICATIONS

Goldstein et al., Improving the Effectiveness of Time-Based Display Advertising, Yahoo! Research, ACM 978-1-4503-1415-2/12/06copyrighted 2012.

* cited by examiner

*Primary Examiner* — Jamara Franklin
(74) *Attorney, Agent, or Firm* — Richard Wilhelm; Gregory K. Goshorn; Greg Goshorn, P.C.

(57) ABSTRACT

Provided are techniques for detecting a presentation of media content on a first display device; synchronizing contextual data corresponding to the media content with the media content; transmitting the contextual metadata corresponding to the media content to a second display device in response to the detecting, wherein the second display device is a different device than the first display device; and presenting the contextual metadata, in synchronization with the media content, on the second display device in conjunction with the presentation of the media content on the first display device.

12 Claims, 5 Drawing Sheets

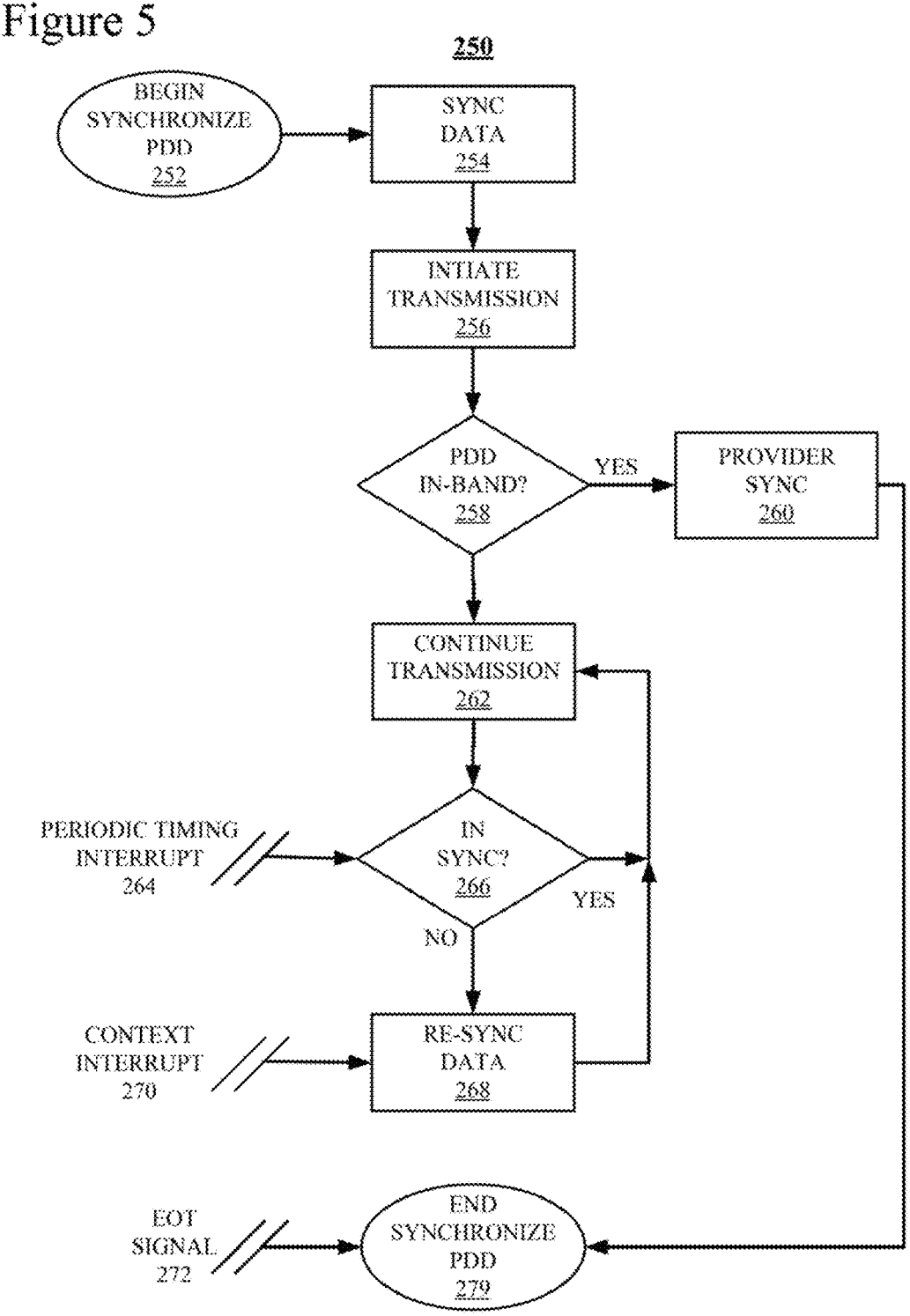

SYNCHRONIZING TWO OR MORE DISPLAY DEVICES TO AUGMENT USER EXPERIENCE

FIELD OF THE DISCLOSURE

The claimed subject matter relates generally to media display and, more specifically, to techniques for synchronizing two or more display devices to augment the user experience.

BACKGROUND

Despite many advances in the presentation of entertainment, for the most part the television viewing experience has remained static. Two improvements that have become available are on-line streaming media, such as NETFLIX® and HULU®, which may be played through mobile devices and conventional televisions, and time-shifting of programming through the use of digital video recorders (DVRs).

Currently, some users may watch movies or shows with digital devices in hand. Sometimes, this type of viewing may involve multitasking, e.g., watching a show while performing unrelated activities such as game playing and communicating with other parties via text or email. Other typical types of multitasking may involve using the digital device to research the movie of show being watched. For example, a user may simultaneously view a movie with a particular actor while searching for information on the actor and their other credits. Other examples include using mobile application to identify a song played or location at which a film was shot or to investigate, and possibly purchase, a viewed item such as art, fashion, clothing, furniture, electronics, an automobile and so on.

SUMMARY

Provided are techniques for the transmission of media content on a first device and the concurrent transmission of information concerning the media content on a second device. Also included are techniques for the synchronization of the content and the information on the two devices.

Provided are techniques for detecting a presentation of media content on a first display device; synchronizing contextual data corresponding to the media content with the media content; transmitting the contextual metadata corresponding to the media content to a second display device in response to the detecting, wherein the second display device is a different device than the first display device; and presenting the contextual metadata, in synchronization with the media content, on the second display device in conjunction with the presentation of the media content on the first display device.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE DRAWINGS

A better understanding of the claimed subject matter can be obtained when the following detailed description of the disclosed embodiments is considered in conjunction with the following figures.

FIG. 5 is a flowchart of one example of a Synchronize PDD process that may implement aspects of the claimed subject matter.

DETAILED DESCRIPTION

Figure 1:
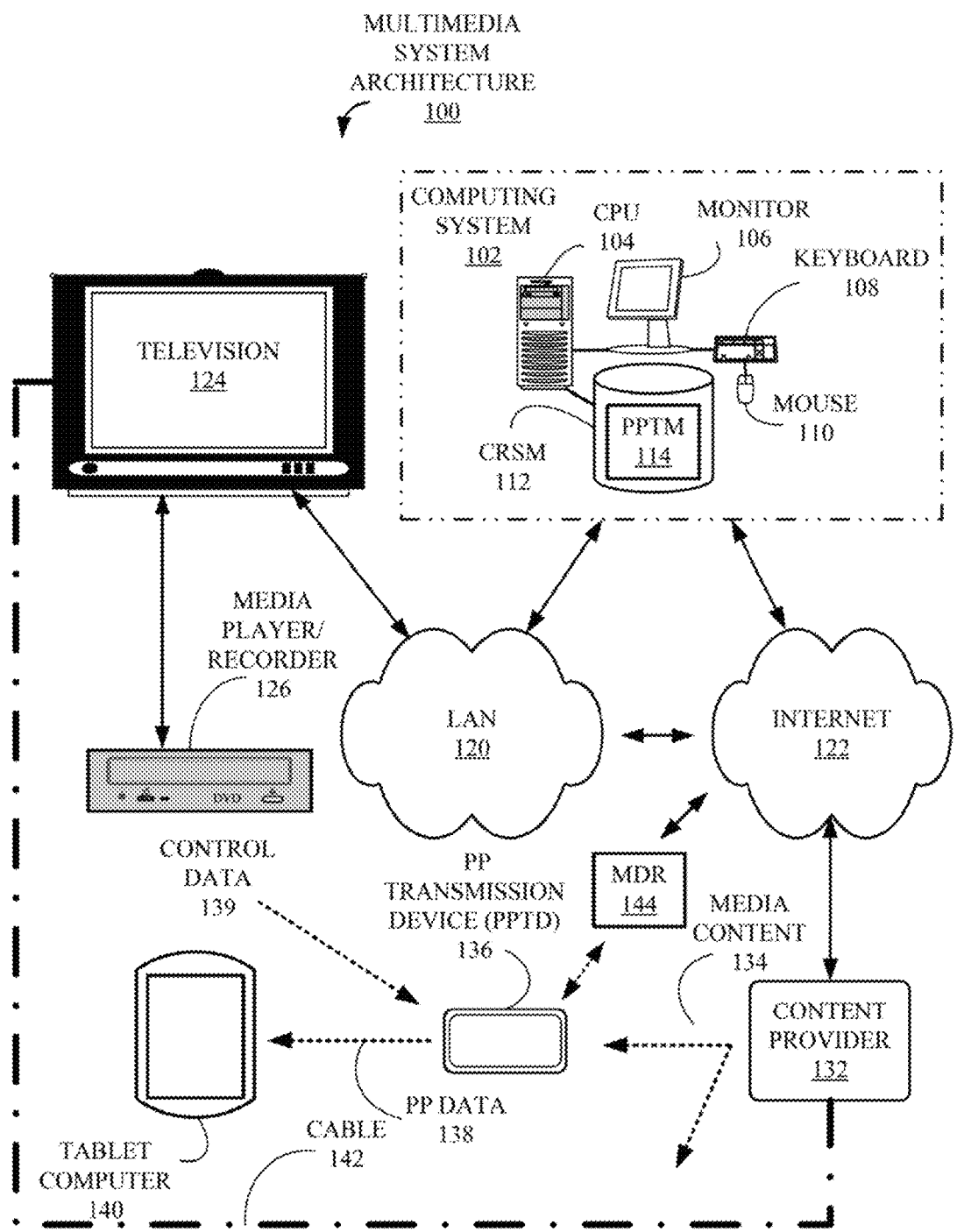
FIG. 1 is an exemplary multimedia system architecture that includes a Parallel Program Transmission Device (PPTD), implemented according to the claimed subject matter.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational actions to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is an exemplary multimedia system architecture 100 that includes both a Parallel Program (PP) Transmission Module (PPTM) 114 and a PP Transmission Device (PPTD) 136, implemented according to the claimed subject matter. PPTM 114 and PPTD 136 are both used as examples of components that may provide aspects of the claimed functionality.

Logic associated with PPTM 114 executes in conjunction with a computing system 102. Computing, system 102 includes a central processing unit (CPU) 104, coupled to a monitor 106, a keyboard 108 and a pointing device, or "mouse," 110, which together facilitate human interaction with computing system 102. Also included in computing system 102 and attached to CPU 104 is a computer-readable storage medium (CRSM) 112, which may either be incorporated into CPU 104 i.e. an internal device, or attached externally to CPU 104 by means of various, commonly available connection devices such as but not limited to, a universal serial bus (USB) port (not shown). Logic associated with PPTM 114 is stored on CRSM 112 and executed on one or more processors (not shown) of CPU 104 and computing system 102.

Computing system 102 is coupled to a local area network (LAN) 120 and the Internet 122. Communicatively coupled to LAN 120 is a display device, which in this example is a television, 124 and, communicatively coupled to television 124 is a media player/recorder 126. Communicatively coupled to Internet 122 is a content provider 132, which is used in the following description as an example of one source of media content. Some examples of media content include, but are not limited to, a television show, a video stream, an audio stream and a movie.

In the following examples, media content 134 from content provider 132 is transmitted to PPTD 136, processed by PPTD 136 and PP data (PPD) 138 associated with media content 134 is transmitted to a second display device, which in this example is a tablet computer 140. Concurrently with media content 134 being transmitted to PPTD 136, media content is transmitted to television 124 over a cable 142. Media content may be transmitted to television 124 for display in any conventional fashion. PPTD 136 also receives control data 139, which is employed to synchronize PPD 138 with media content 134. Depending upon a particular display configuration, control data 139 may originate from computing system 102, content provider 132, television 126 or media player/recorder 126 (see 250, FIG. 5).

In this example, PPD 138 originates at a Metadata Resource (MDR) 144, which is one example of a source for such data. It should be noted that, in this example, PPD 138 represents information specific to media content 134 and MDR 144 is a repository for formation on multiple instances of media content in general, including PPD 138. PDD 138 may be generated by, but not limited to, staff associated with media content; crowd sourcing; and analytic analysis. PPD 138 may be stored, before use, either co-located with the video program content, or at a third party provider such as MDR 144. Examples of third party providers include any services that provide information about media content. It should be noted that PPD 138 and MDR 144 may be stored as digital files at any standard website, where it may be retrieved at user convenience. Immediately before transmission to a mobile device, PPD 138 may be cached in conventional means (i.e., content caching services), and/or stored in local devices, such as on a set-top box, DVR, conventional television, other alternative mobile devices, or home entertainment system.

PPD 138 may contain either rich content on media content 134 itself, or pointers (e.g., web links) to other definitive sources containing rich data sets about the program, alternate video, audio, or pictures. In some cases, PPD 138 may contain links to other programs (via Uniform Resource Identifier, or URI, outside of the web) which activate other programs on the mobile device (e.g. Twitter, Facebook, Google Plus, etc.). Specific logical elements of PPD 138 may include, but are not limited to, information about persons involved in creation of media content 134 (e.g., actors and actresses, producers, directors, and other credited staff), information about location and objected depicted within media content 138, information about music contained within media content 138, as well as other facts which consumers might find of interest.

PPD 138 also includes either an explicit or implicit temporal component. In other words, PDD 138 either contains explicit time stamps which may be associated with various points in media content 134, or otherwise have an enablement mechanism by which PPD 138 can be synchronized to media content 134. Examples of the latter (implicit temporal awareness) may be derived from a delivery mechanism, e.g., if PPD 138 is broadcast synchronously with media content 134, media content 134, then no explicit, running time stamp may be necessary.

PPD 138 and MDR 144 may be manually created through dedicated "expert" means. For example, staff of video program creators, broadcast company, or third party service may compile information about media content 134, and embed the information such that they may be displayed at the appropriate time within (or throughout) presentation of media content 134 the video. PPD 138 and MDR 144 may be manually created through "crowd-sourcing" means. For example, a wiki-type open community may contribute ideas to PPD 138 and MDR 144, including facts which may be little known, for the benefit of the consumer. PPD 138 and MDR 144 may also be created through automated means through analytics services. For example, visual elements may be identified through facial, place, or object recognition software. Additionally, audio elements may be identified through analogous services. For example, PPD 138 and MDR 144 may be in part or in full created through automated fashion for the benefit of consumers. Finally, some combination of manual and automated services such as are described here may be used to populate PPD 138 and MDR 144 with information.

It should be understood that architecture 100 is merely one example of a configuration that may support the claimed subject matter. Those with skill in the relevant arts will appreciate that media content may originate from a wide variety of sources, that such content may be transmitted to many different types of devices in many different ways, both by wire and wireless, and that the claimed subject matter may be performed by a number of different types of devices. For example, rather than a tablet computer 140, the second display device may be a mobile telephone and, in addition to the description below that uses PPTD 136, the claimed subject matter may be implemented by PPTM 114 or logic associated with television 124 or media player/recorder 126. Further, additional PDD, distinct from PDD 138 may be transmitted to and displayed on a third device, distinct from television 124 and tablet computer 140.

Further, television 124 may be Internet-enabled or, in other words, able to download an appropriate signal from Internet 122. Programming signals, or media content, may be transmitted by content provider 132 via Internet 122 or cable 142. In other words, content provider 132 may transmit programming to television 124 via Internet 122, cable 142 or both.

Figure 2:
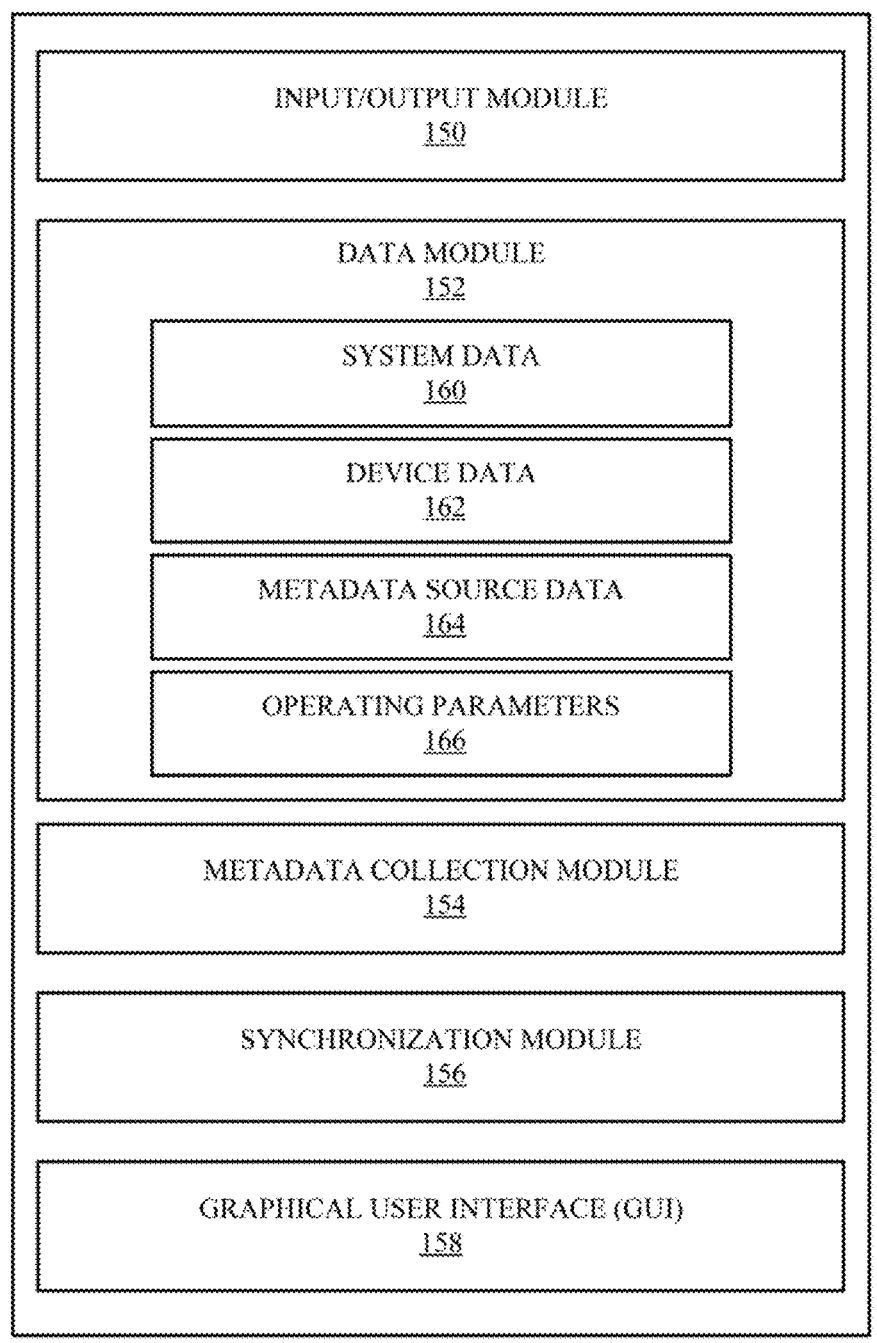
FIG. 2 is a block diagram of PPTD of FIG. 1 in greater detail.

FIG. 2 is a block diagram of PPMD 136, introduced above in FIG. 1, in greater detail. PPMD 136 includes an input/output (I/O) module 150, a data module 152, a metadata collection module 154, a synchronization module 156 and a graphical user interface (GUI) 158. For the sake of the following examples, PPMD 136 is assumed to be a stand-alone device with its own CRSM (not shown) and one or more processors (not shown). In the alternative, as explained above, the claimed functionality may be stored on CRSM 112 (FIG. 1) in conjunction with PPTM 114 (FIG. 1) and execute on one or more processors (not shown) of computing system 102 (FIG. 1) or implemented in conjunction with television 124 (FIG. 1) or media player/recorder 126 (FIG. 1). In addition, it should be understood that the representation of PPMD 136 in FIG. 2 is a logical model. In other words, components 150, 152, 154, 156 and 158 may be stored in the same or separates files and loaded and/or executed within system 100 either as a single system or as separate processes interacting via any available inter process communication (IPC) techniques.

I/O module 150 handles any communication PPMD 136 has with other components of system 100, including but not limited to, the Internet 122, content provider 132 and tablet computer 140. Data module 152 stores information that PPMD 136 requires during normal operation. Examples of the types of information stored in data module 152 include system data 160, device data 162, a metadata source data 164 and operating parameters 166.

System data 160 stores information on different components of architecture 100 (FIG. 1), including but not limited to, devices and communication media. PPMD 136 employs such information to communicate with other devices and components of architecture 100. Device data 162 stores information on different devices, such as television 124 (FIG. 1) and tablet computer 140 (FIG. 1) that may be used to display either media content or metadata in accordance with the claimed subject matter.

Metadata source data 164 stores information on various sources for information about media content 134, such as MDR 144 (FIG. 1), that may be transmitted in conjunction with media content 134. For example, if media content 134 is a movie, metadata source data 164 may provide links to a database that includes information about the trivia, actors and products within the movie. Operating parameters 166 stores information on various user preferences that have been set. For example, a user may specify default devices for display or a particular default category (see 182, 184 and 186, FIG. 3). Variables (not shown) in operating parameters 166 are typically set via GUI 158.

Metadata collection module 154 analyses media content 134 and collects metadata associated with media content 154 using information in metadata source data 164. Such metadata may be collected comprehensively or "on demand." For example, information on the actors within media content 134 may be collected as soon as media content 134 is identified or, in the alternative, only in response to a request by the user for actor information. The particular type of data collection, i.e., comprehensive or "ad hoc," may be specified by a variable in operating parameters 166.

Synchronization module 156 coordinates information collected by metadata collection module 154 with the specific portion of media content 134 currently being displayed. For example, if a user request actor or product information, information only on the actors or products, respectively, currently display on television 124 is presented to the user on tablet computer 140. GUI 158 enables users of PPMD 136 to interact with and to define the desired functionality of PPMD 136. Components 150, 152, 154, 156, 158, 160, 162, 164 and 166 are described in more detail below in conjunction with FIGS. 3-5.

Figure 3:
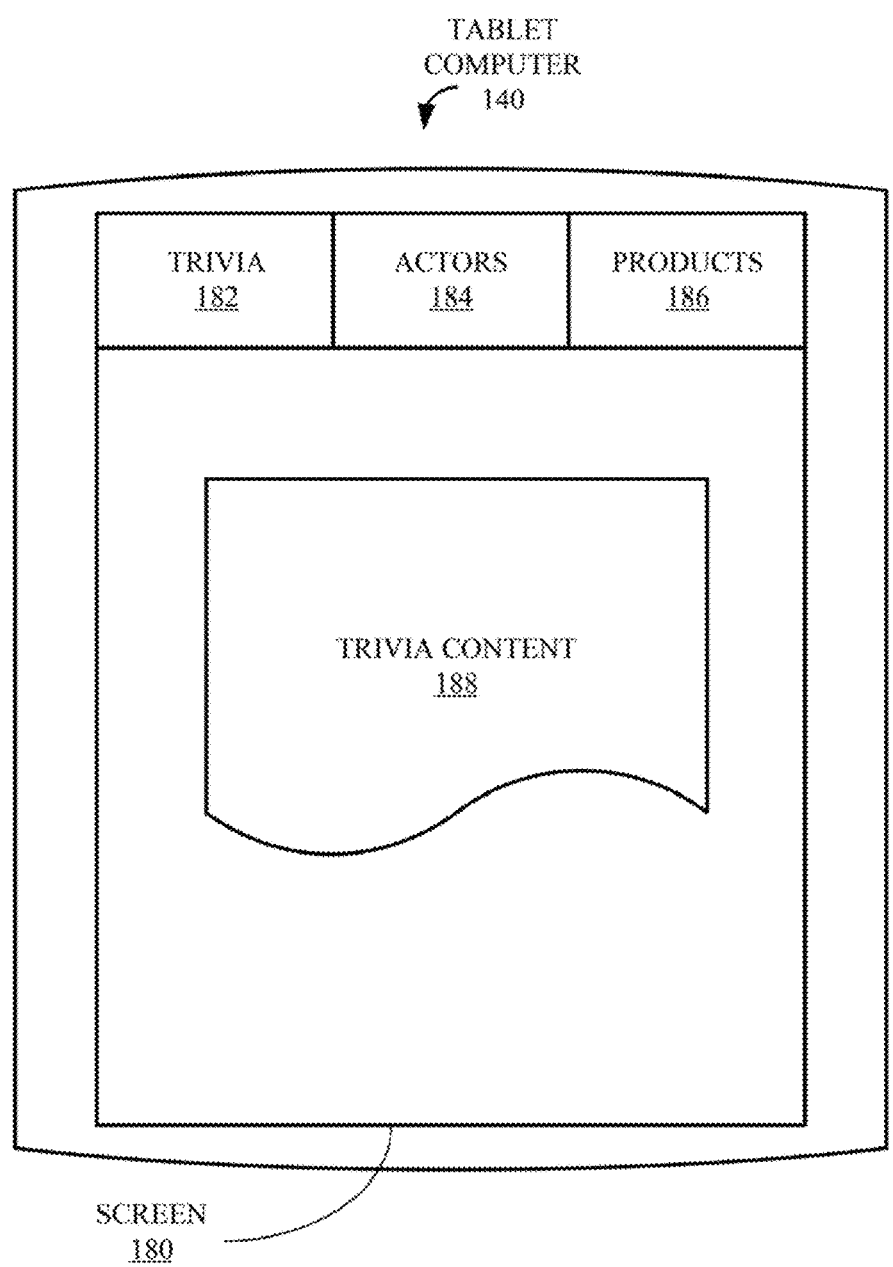
FIG. 3 is an illustration of information displayed in accordance with the claimed subject matter.

FIG. 3 is an illustration of tablet computer 140 (FIG. 1) displaying information transmitted from PPTD 136 (FIGS. 1 and 2) in accordance with the claimed subject matter. Table computer 140 includes a screen 180. Displayed in screen 180 are three (3) possible categories of information related to, in this example, media content 134 (FIG. 1). The categories include "Trivia" 182, "Actors" 184 and "Products" 186. Each of categories 182, 184 and 186 represent examples of types of metadata that may be displayed in conjunction with the display of media content 134 on, in this example, television 124 (FIG. 1). Trivia 182 represents information relating to trivia associated with media content 134 such as, but not limited to, information on the creation of media content 134. Actors 184 represents information on actors associated with media content 134. Products 186 represents information on products that may be viewed within media content 134. It should be understood that categories 182 184 and 186 are merely examples of types of metadata that may be made available in accordance with the claimed subject matter.

A user (not shown) who is viewing content 134 on television 124 and viewing metadata on table computer 140 may select one of the categories 182, 184 and 186 by tapping on the corresponding portion of screen 180. In this example, the user has selected Trivia 182 and Trivia Content 188 is displayed on screen 180.

Figure 4:
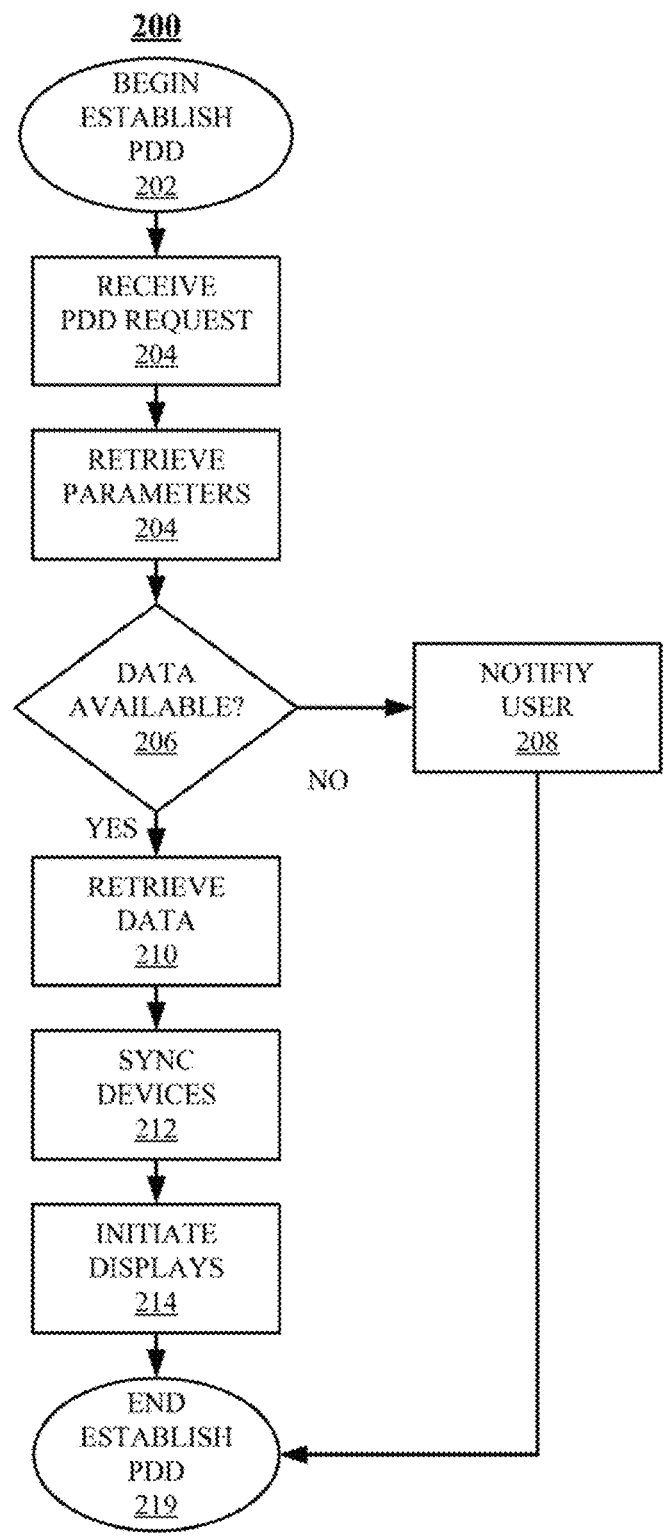
FIG. 4 is a flowchart of one example of an Establish Parallel Data Display (PDD) process that may implement aspects of the claimed subject matter.

FIG. 4 is a flowchart of one example of an Establish Parallel Data Display (PDD) process 200 that may implement aspects of the claimed subject matter. In the following example, process 200 is associated with logic stored and executed on one or more processors (not shown) of PPTD 136 (FIG. 1 and 2). It should be noted that, as explained above in conjunction with FIG. 1, PPTD 136 is only one device that may implement the claimed subject matter and may also be, but is not limited to, implemented by PPTM 114 or logic associated with computing system 102 (FIG. 1) television 124 (FIG. 1) or media player/recorder 126 (FIG. 1). In the following example, media content 134 is displayed on television 124 in conjunction with PPD 138 displayed on tablet computer 140.

Process 200 starts in a "Begin Establish PDD" block and proceeds immediately to a "Receive PDD Request" block 204. During processing associated with block 204, PPTD 136 receives a request to initiate transmission of media content 134 to television 124. During processing associated with a "Retrieve Parameters" block 204, PPTD 136, after identifying television 124, tablet computer 140 and media content 134, retrieves information about television 124 and tablet computer 140 from device data 162 (FIG. 2) and any potential sources of information about media content from metadata resources 164 (FIG. 2). During processing associated with a "Data available?" block 206, a determination is made as to whether or not any data, such as in this example PPD 138, is available for media content 134. If not, control proceeds to a "Notify User" block 208. During processing associated with block 208, the user who requested the transmission of media content 134 is notified that PPD 138 is not available and the transmission of media content 134 proceeds in a conventional manner. If, during processing associated with block 206, a determination is made that PPD 138 is available, control proceeds to a "Retrieve Data" block 210, during which PPD 138 is retrieved from the identified source.

During processing associated with a "Sync Devices" block 212, media content 134 and PPD 138 are synchronized so that, once the presentation of media content 134 is initiated, the data displayed on tablet computer 140 corresponds to the specific portion of media content 134 being displayed on television 124 (see 250, FIG. 5). During processing associated with an "Initiate Displays" block 214, media content 134 is presented on television 124 and PPD 138 is presented on tablet computer 140 in accordance with the disclosed technology. Finally, once the user has been notified during processing associated with block 208 or the display of media content 134 and PPD 138 has been initiated during processing associated with block 214, control proceeds to an "End Establish PDD" block 219 in which process 200 is complete.

FIG. 5 is a flowchart of one example of a Synchronize PDD process 250 that may implement aspects of the claimed subject matter. Like process 200, in this example, process 250 is associated with logic stored and executed on one or more processors (not shown) of PPTD 136 (FIGS. 1 and 2). It should be noted that, as explained above in conjunction with FIG. 1, PPTD 136 is only one device that may implement the claimed subject matter and may also be, but is not limited to, implemented by PPTM 114 or logic associated with computing system 102 (FIG. 1) television 124 (FIG. 1) or media player/recorder 126 (FIG. 1).

Process 250 starts in a "Begin Synchronize PPD" block and proceeds immediately to a "Sync Data" block 254. During processing associated with block 254, PPTD 136 receives indication that particular media content, in this example media content 138, is to be displayed in conjunction with the disclosed techniques. Typically, block 254 is performed at the beginning of a transmission, or presentation, of the particular media content. It should be understood that process 250, in addition to the synchronization of data at the beginning of a presentation, is also responsible for ensuring that PPD 138 (FIG. 1) and media content 134 (FIG. 1) are synchronized throughout a presentation on, in this example tablet computer 140 (FIGS. 1 and 3). For example, a viewer may pause, fast forward, return to a previous spot or jump to a future position in the media content. In such cases, PPD 138 must be re-synchronized to reflect the current position in the presentation.

Once PPD 138 has been synchronized during processing associated with block 254, control proceeds to an "Initiate Transmission" block 256 in which both media content 134 and PPD 138 are simultaneously transmitted to their respective devices (see 214, FIG. 4). During processing associated with a "PPD In-band?" block 258, a determination is made as to whether or not PPD 138 is being transmitted as part of media content 134, i.e., by the media content provider 132 (FIG. 1). If so, control proceeds to a "Provider Sync" block 260, which represents the situation in which the provider of the media content is able to be responsible for the synchronization of PSS and the media content. If, during processing associated with block 258, a determination is made that PDD is not in-band, control proceeds to a "Continue Transmission" block 262. During processing associated with block 262, the presentation of media content 134 and PPD 138 are assumed to be synchronized and the presentations merely proceed.

In response to a periodic timing interrupt 264, control proceeds to an "In Sync?" block 266. During processing associated with block 266, a determination is made as to whether or not media content 134 and PPD 138 are still synchronized, in this example by a comparison of their respective timestamps (not shown). If so, control returns to block 262 and processing continues as described above. If not, control proceeds to a "Re-Sync Data 268, during which media content 134 and PPD 138 are resynchronized before returning to Continue Transmission block 262. Re-Sync Data block 268 may also be entered via a Context Interrupt 270, which would typically be transmitted by computing system 102, television 124 or media player/recorder 126 in response to a change in the presentation of media content 134, such as, but not limited to, a pause, fast forward, rewind, or jump to another portion of media content 138 by the user. Context interrupt 270 may also be generated by PPTD 136 based upon a monitoring of the presentation of media content 134.

Finally, in response to an End-of-Transmission (EOT) signal 272, control proceeds to an "End Synchronize PDD" block 279 in which process 250 is complete. During typical processing, process 250 loops through blocks 262, 264 and 268 to ensure that media content 134 and PPD 138 remain synchronized during presentation of media content 134 on television 124 and PPD 138 on tablet computer 140.

While the claimed subject matter has been shown and described with reference to particular embodiments thereof, it will be understood by those skilled in the art that the foregoing and other changes in form and detail may be made therein without departing from the spirit and scope of the claimed subject matter, including but not limited to additional, less or modified elements and/or additional, less or modified blocks performed in the same or a different order.

We claim:

1. An apparatus, comprising:
   a plurality of processors;
   a non-transitory computer-readable storage medium; and
   logic, stored on the computer-readable storage medium and executed on the plurality of processors, for:
      detecting a presentation of media content on a first display device;
      synchronizing contextual metadata corresponding to the media content with the media content;
      transmitting the contextual metadata corresponding to the media content to a second display device in response to the detecting, wherein the second display device is a different device than the first display device; and
      presenting the contextual metadata, in synchronization with the media content, on the second display device in conjunction with the presentation of the media content on the first display device.

2. The apparatus of claim 1, wherein the contextual metadata is selected from a group consisting of:
   rich content information corresponding to the media content;
   an alternative video;
   pictures associated with the media content;
   production information associated with the media content; and
   information on a consumer product associated with the media content.

3. The apparatus of claim 1, the logic further comprising logic for synchronizing the media content and the contextual metadata based upon a plurality of group consisting of:
   a signal transmitted in conjunction with the media content;
   timing associated with the media content;
   an image presented in conjunction with the media content; and
   an audio signal presented in conjunction with the media content.

4. The apparatus of claim 1, wherein the media content is one or more of a group consisting of:
   a television show;
   a video stream;
   an audio stream; and
   a movie.

5. The apparatus of claim 1, wherein the contextual metadata is received from one or more of a group consisting of:
   the media content;
   an originator of the media content;
   a website; and
   a broadcaster of the media content.

6. The apparatus of claim 1, the logic further comprising logic for:
   transmitting additional contextual metadata, different than the contextual data, corresponding to the media content to a third display device in response to the detecting, wherein the third display device is a different device than both the first and second display devices; and
   presenting the additional contextual metadata, in synchronization with the media content, on the third display device in conjunction with the presentation of the media content on the first display device.

7. A computer programming product for providing content metadata in conjunction with the presentation of media content comprising a non-transitory computer-readable storage medium having program code embodied therewith, the program code executable by a plurality of processors to perform a method comprising:
   detecting a presentation of media content on a first display device;
   synchronizing contextual metadata corresponding to the media content with the media content;
   transmitting the contextual metadata corresponding to the media content to a second display device in response to the detecting, wherein the second display device is a different device than the first display device; and
   presenting the contextual metadata, in synchronization with the media content, on the second display device in conjunction with the presentation of the media content on the first display device.

8. The computer programming product of claim 7, wherein the contextual metadata is selected from a group consisting of:
   rich content information corresponding to the media content;
   an alternative video;
   pictures associated with the media content;
   production information associated with the media content; and
   information on a consumer product associated with the media content.

9. The computer programming product of claim 7, the method further comprising synchronizing the media content and the contextual metadata based upon a plurality of group consisting of:
   a signal transmitted in conjunction with the media content;
   timing associated with the media content;
   an image presented in conjunction with the media content; and
   an audio signal presented in conjunction with the media content.

10. The computer programming product of claim 7, wherein the media content is one or more of a group consisting, of:
    a television show;
    a video stream;
    an audio stream; and
    a movie.

11. The computer programming product of claim 7, wherein the contextual metadata is received from one or more of a group consisting of:
    the media content;
    an originator of the media content;
    a website; and
    a broadcaster of the media content.

12. The computer programming product of claim 7, the method further comprising:
    transmitting additional contextual metadata, different than the contextual data, corresponding to the media content to a third display device in response to the detecting, wherein the third display device is a different device than both the first and second display devices; and presenting the additional. contextual metadata in synchronization with the media content, on the third display device in conjunction with the presentation of the media content on the first display device.

\* \* \* \* \*